(12) United States Patent
Baba (10) Patent No.: US 11,752,609 B2
(45) Date of Patent: Sep. 12, 2023

(54) DRIVING TOOL

(71) Applicant: MAKITA CORPORATION, Anjo (JP)

(72) Inventor: Norikazu Baba, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/559,717

(22) Filed: Dec. 22, 2021

(65) Prior Publication Data

US 2022/0241948 A1  Aug. 4, 2022

(30) Foreign Application Priority Data

Feb. 3, 2021  (JP) .................................. 2021-015600

(51) Int. Cl.
*B25C 1/04*  (2006.01)
*B25C 1/06*  (2006.01)
*B23Q 11/10*  (2006.01)

(52) U.S. Cl.
CPC ................ *B25C 1/047* (2013.01); *B25C 1/06* (2013.01); *B23Q 11/1092* (2013.01)

(58) Field of Classification Search
CPC ..... B23Q 11/1092; B23Q 11/10; B25C 1/047; B25C 1/04; B25C 1/06; B25C 1/008
See application file for complete search history.

(56) References Cited

U.S. PATENT DOCUMENTS

2021/0138622 A1 * 5/2021 Enta ........................ B25C 1/047

FOREIGN PATENT DOCUMENTS

WO  2018/180082 A1  10/2018
WO  WO-2018180082 A1 * 10/2018 ......... B23Q 11/1092

OTHER PUBLICATIONS

Enta et al, Machine Translation of WO-2018180082-A1, 2018 (Year: 2023).*

* cited by examiner

*Primary Examiner* — Anna K Kinsaul
*Assistant Examiner* — Veronica Martin
(74) *Attorney, Agent, or Firm* — Oliff PLC (57) ABSTRACT

A driving tool includes a driver for driving a driving material and an elastic material for biasing the driver downward. The driving tool includes a lifter that is rotated by an electric motor. The lifter moves the driver to a top dead center against a biasing force of the elastic material. The driver includes a plurality of linearly arranged engaging teeth. The lifter includes a plurality of peripherally arranged engaging pins that are engageable with the plurality of engaging teeth. The lifter also includes a wheel that comprises a plurality of peripherally arranged pin supporting holes, each of which holds an end of the corresponding engaging pin. The lifter includes a grease groove and a recessed grease reservoir adjacent to the grease groove. The grease groove is formed in a pin supporting hole, such that the grease groove extends in a pin supporting hole extending direction.

20 Claims, 11 Drawing Sheets

DRIVING TOOL

CROSS-REFERENCE TO RELATED APPLICATIONS

This application claims priority to Japanese patent application serial number 2021-015600, filed on Feb. 3, 2021, the contents of which are incorporated herein by reference in their entirety for all purposes.

BACKGROUND

The present disclosure generally relates to a driving tool for driving a material, such as a nail or a staple, into a workpiece, such as, for example, a wooden material.

Driving tools which drive a driving member by moving a driver utilizing an elastic material, such as, for example, a gas serving as a spring or a mechanical spring, are well known. A gas-spring type driving tool disclosed in, for example, International Publication No. 2018/180082, may include a driver for driving a driving member, a driving mechanism for driving the driver in a downward direction, and a lifter for moving the driver in an upward direction. The driving mechanism may include an accumulation chamber, a piston, and a cylinder. An elastic material, such as a gas filled in the accumulation chamber, may store an energy for driving the driver. The driver may be formed integral with a piston. The lifter may include engaging pins engageable with engaging teeth of a rack that is formed in the driver.

The lifter may hold the driver in a standby position, which is in a vicinity of a top dead center, before a driving operation is performed. When a user pulls a switch lever of the driving tool to turn on an activation switch, the driver may move from the standby position to the top dead center. While the driver and the piston are moved by the lifter, a pressure of the gas in the accumulation chamber may increase. Utilizing the pressure of the gas stored in the accumulation chamber, the driver and the piston can be moved downward, thereby causing the driving material to be driven by the driver.

When the driver moves from the standby position to the top dead center and the engaging pin disengages the engaging teeth of the rack, the engaging pin that engages the last engaging tooth of the rack may receive an extremely large external force from the last engaging tooth. Because of this, the engaging pin may tend to wear. The above-described International Publication No. 2018/180082, for example, discloses that a lubricant impregnated member, in which a lubricant is impregnated, may contact an engaging pin to apply the lubricant to the engaging pin.

In the above configuration in which the lubricant impregnated member is used, it may be necessary to separately prepare a material to be impregnated with the lubricant. Also, it may be necessary to secure a space to place the lubricant impregnated member near to the lifter. Furthermore, it may be necessary to lower the viscosity of the lubricant in order to impregnate it with the impregnating material. This may cause the lubricant to not remain on a surface of the engaging pin.

Thus, there is a need for another configuration that can reduce the wear of the engaging pin of the lifter that receives a large external force. For example, there is a need for a configuration in which a lubricant that has high viscosity may remain on the surface of the engaging pin, thereby reducing the wear of the engaging pin. Thus, there is a need to supply a lubricant with high viscosity on the surface of the engaging pin of the lifter to reduce wear of the engaging pin.

SUMMARY

According to one feature of the present disclosure, a driving tool comprises a driver that is movable in an up-down direction and that drives a driving member by moving downward. The driving tool also comprises an elastic material that biases the driver in a downward direction. The driving tool further comprises an electric motor serving as a power source, and a lifter that is rotated by the electric motor and moves the driver to a top dead center against a biasing force of the elastic material. The driver includes a plurality of engaging teeth that are linearly arranged. The lifter comprises a plurality of engaging pins arranged in a peripheral direction so as to be engageable with the plurality of engaging teeth. The lifter also comprises a wheel including a plurality of pin supporting holes arranged in a peripheral direction, each of the plurality of pin supporting holes holding an end of the corresponding engaging pin. The lifter further comprises a grease groove that is formed on at least one of the plurality of pin supporting holes, the grease groove extending in a direction in which the at least one of the plurality of pin supporting holes extends, and a grease reservoir that is recessed and positioned adjacent to the grease groove.

Because of this configuration, a lubricant, such as, for example, grease, can be supplied to a surface of the engaging pin supported by the pin supporting hole through the grease groove of the pin supporting hole. Thus, the grease groove can supply a high viscosity lubricant to the surface of the engaging pin. As a result, wear of the engaging pin can be reduced.

According to another feature of the present disclosure, the grease reservoir is positioned on a side of a position where the engaging pin contacts the engaging tooth when the driver moves upward. The engaging pin may receive a large external force on the side of the position where the engaging pin contacts the engaging tooth. Because of this configuration, the lubricant can be supplied to the position where the surface of the engaging pin receives the large external force. As a result, wear of the engaging pin can be reduced with a small quantity of lubricant.

According to another feature of the present disclosure, the driving tool further comprises a cover that is attached to the wheel, the cover being configured to cover one end of each pin supporting hole. Further, the grease reservoir is formed in the cover. Because of this configuration, the lubricant can be supplied to the surface of the engaging pin without substantially changing the shape of the lifter.

According to another feature of the present disclosure, the cover includes an engaging protrusion that protrudes from a surface of the cover. Further, the wheel includes an engaging recess that engages the engaging protrusion of the cover, so as to prevent the cover from rotating with respect to the wheel. Because of this configuration, a position of the grease reservoir formed in the cover is fixed relative to the engaging pin of the wheel and the grease groove. As a result, the lubricant can be supplied to the surface of the engaging pin from the grease reservoir through the grease groove at all times.

According to another feature of the present disclosure, a center of the grease reservoir is offset relative to a center axis of the engaging pin. Because of this configuration, the engaging pin can be prevented from moving in an axial direction so as to enter the grease reservoir. As a result, the engaging pin can firmly support the engaging tooth while receiving a large external force.

According to another feature of the present disclosure, a center of the grease reservoir is disposed in a direction in which the grease groove extends. Because of this configuration, the grease groove is positioned such that a reference line extending in a direction in which the grease groove extends passes through approximately a center of the grease reservoir. The center of the grease reservoir can hold a larger quantity of the lubricant than an edge portion of the grease reservoir. As a result, the lubricant can be supplied to the surface of the engaging pin without interruption.

According to another feature of the present disclosure, the elastic material is a fluid. The fluid may possess a specified amount of energy for driving the driver when a driving operation is not performed. Thus, the engaging pin may continue to receive a large external force from the engaging tooth. Because of this configuration, by supplying the lubricant from the grease reservoir to the surface of the engaging pin at all times, wear of the engaging pin that continues to receive the large external force can be reduced.

According to another feature of the present disclosure, the plurality of engaging pins include a hindmost engaging pin that engages one of the plurality of engaging teeth so as to move the driver to the top dead center. Further, the grease reservoir and the grease groove are disposed adjacent to the pin supporting hole that holds the hindmost engaging pin. Because of this configuration, the lubricant can be supplied to the hindmost engaging pin, which receives the large external force. As a result, wear of the hindmost engaging pin can be reduced.

According to another feature of the present disclosure, the grease reservoir is formed in a hemispherical shape. Because of this configuration, the lubricant may be less prone to leave at an edge portion of the grease reservoir. As a result, the lubricant can be supplied to the grease groove from the grease reservoir without interruption

DETAILED DESCRIPTION

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

Figure 1:
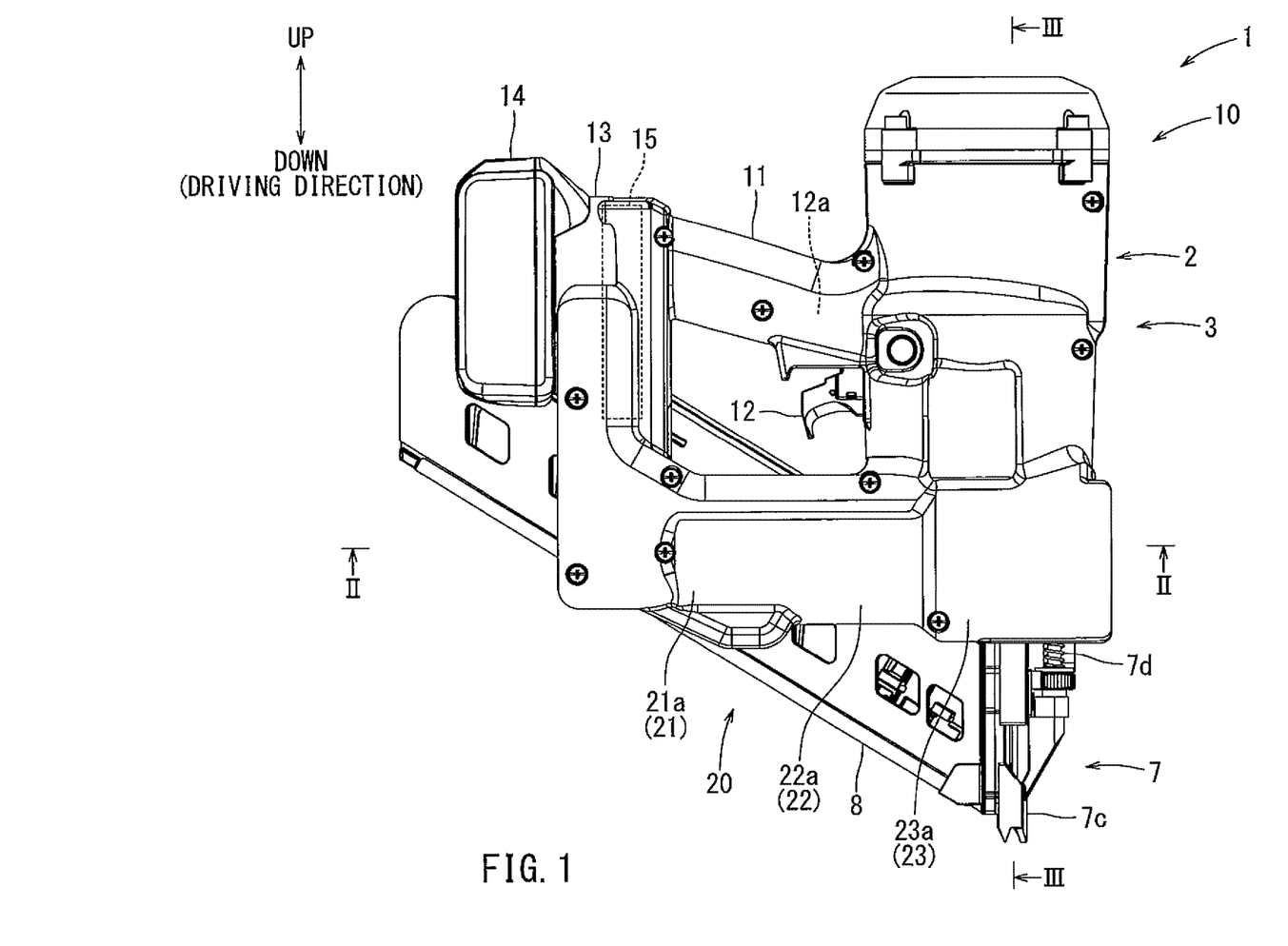
FIG. 1 is a side view of a driving tool according to a first embodiment of the present disclosures.

A driving tool 1 according to a first embodiment of the present disclosures will be described with reference to FIGS. 1 to 14. In the embodiment, a gas-spring type driving tool 1 will be exemplified as the driving tool 1. The gas-spring type driving tool 1 may utilize the pressure of a gas (elastic material or fluid) filled in an accumulation chamber 4a as a driving force for driving a driving member n. As shown in FIG. 1, the driving tool 1 may include a tool main body 10 that has a tubular main body housing 2, and a handle 11 that extends from a lateral side of the tool main body 10. A driving nose 7 may be provided at a tip end of the tool main body 10. The driving nose 7 may contact a workpiece W, thereby ejecting a driving member n from the driving nose 7. In the following explanation, an up-down direction is defined such that a driving direction of the driving member n is a downward direction.

Figure 3:
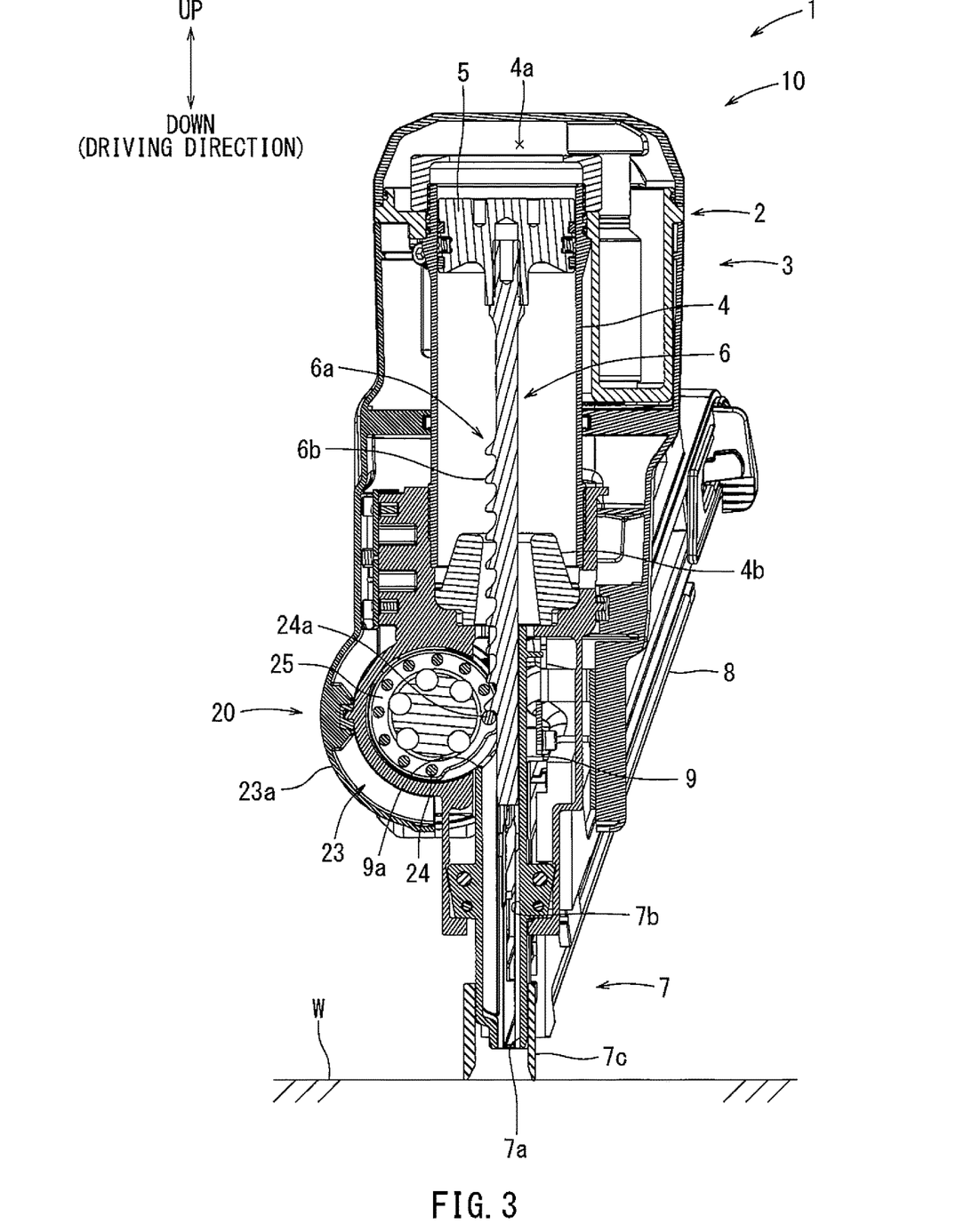
FIG. 3 is a cross-sectional view taken along line of FIG. 1, showing a standby state of the driving tool.

As shown in FIG. 3, the tool main body 10 may include a driving mechanism 3 for driving the driving member n in a downward direction. The driving mechanism 3 may include a cylinder 4 housed within the main body housing 2, and may also include a piston 5 supported by the cylinder 4 so as to be reciprocated in an up-down direction. An accumulation chamber 4a may be formed so as to be enclosed by the main body housing 2 above the cylinder 4 and the piston 5. A driver 6 for driving a driving member n may be provided to extend downward from a center of a lower surface of the piston 5. The driver 6 may extend long in the downward direction. A lower portion of the driver 6 may enter a driving passage 7b of the driving nose 7. The driving passage 7b may be formed in an interior of a tubular driver guide 9. An ejection port 7a, out of which the driving member n is driven, may open at a lower end of the driving nose 7.

As shown in FIG. 3, a magazine 8, in which a plurality of driving members n is loaded, may be combined with a lateral portion of the driver guide 9. A driving member n may be supplied from the magazine 8 to the driving passage 7b. The driving member n supplied to the driving passage 7b may be driven by the driver 6 that is moved by the driving mechanism 3, thereby driving the driving member n into the workpiece W.

As shown in FIGS. 1 and 3, a contact arm 7c, which is slidable in the up-down direction, may be provided at a tip end of the driving nose 7. The contact arm 7c may be spring-biased in a downward direction by a compression spring 7d. The contact arm 7c may move upward against a biasing force of the compression spring 7d by contacting the workpiece W. A switch lever 12, which can be pulled by a finger of a user's hand holding the handle 11, may be provided at a basal portion of the handle 11. An activation switch 12a may be housed above the switch lever 12 in the tool main body 10. The activation switch 12a may be turned on by pulling the switch lever 12. When the contact arm 7c contacting the workpiece W is moved upward and the activation switch 12a is turned on, a driving operation of the driver 6 may be performed.

As shown in FIG. 1, a battery attachment portion 13, to which a battery pack 14 serving as a power source can be attached, may be provided at an end portion of the handle 11. The battery attachment portion 13 may have a rectangular shape extending in the up-down direction. The battery pack 14 may be removed from the battery attachment portion 13 to be repeatedly recharged by a dedicated charger. The battery pack 14 may be used as a power source for various electric power tools. A controller 15 housed in a rectangular case may be housed in the battery attachment portion 13.

Referring to FIG. 3, the driving tool 1 may include a return mechanism 20 for returning the piston 5 and the driver 6 in an upward direction. The piston 5 may be returned upward in accordance with an upward movement of the driver by the return mechanism 20. Because of this configuration, the pressure of the gas in the accumulation chamber 4a on an upper side of the piston 5 may increase. As a result, a driving energy (a thrust power by the gas pressure) may be stored in the accumulation chamber 4a. A damper 4b, which can absorb an impact when the piston 5 moves to a bottom dead center, may be provided at a lower portion of the cylinder 4.

Figure 2:
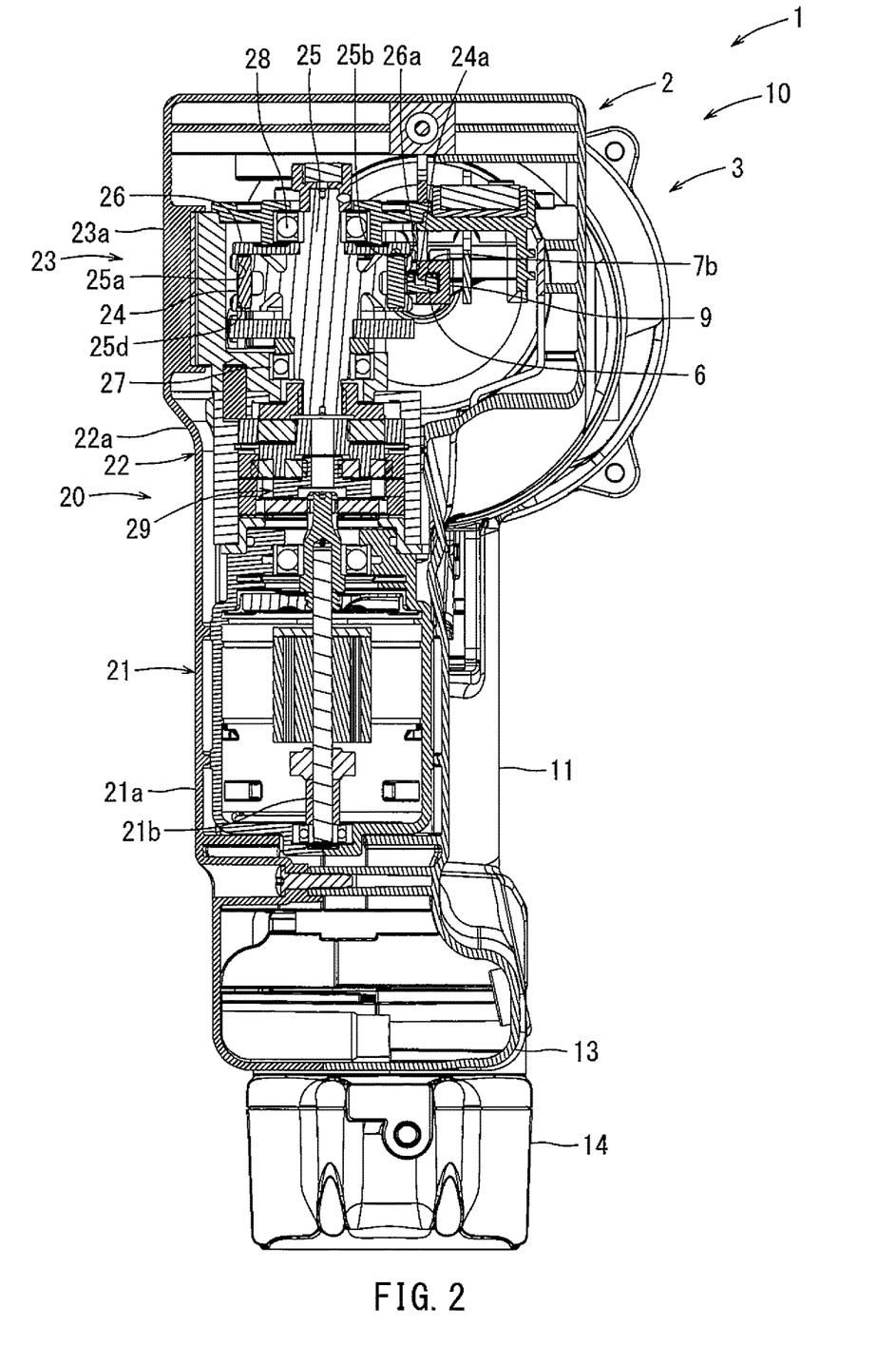
FIG. 2 is a cross-sectional view taken along line II-II of FIG. 1.

As shown in FIGS. 1 and 2, the return mechanism 20 may include an electric motor 21, a reduction gear train 22, and a lifter 23. The electric motor 21 may be housed in a tubular motor case 21a. The reduction gear train 22 may be housed in a tubular gear case 22a. The lifter 23 may be housed in a tubular lifter case 23a. The lifter case 23a, the gear case 22a, and the motor case 21a may be arranged in this order from a side near to the driving nose 7. The lifter case 23a may be joined to the gear case 22a, and the gear case 22a may be joined to the motor case 21a. The motor case 21 may be joined to the battery attachment portion 13. Because of this configuration, the main body housing 2, the handle 11, the battery attachment portion 13, the motor case 21a, the gear case 22a, and the lifter case 23a may be formed in a loop shape.

The electric motor 21 may include a motor shaft 21b extending in a vertical direction (in an up-down direction in FIG. 2). The electric motor 21 may be rotated by the battery pack 14 serving as a power source. The electric motor 21 may be started based on an upward movement of the contact arm 7c and a pulling operation of the switch lever 12. A rotation output of the electric motor 21 may be reduced by the reduction gear train 22 before being output to the lifter 23.

As shown in FIGS. 2 and 3, the lifter 23 may include a wheel 25, which may be cylindrically shaped, and a plurality of engaging pins 24 supported by the wheel 25. The wheel 25 may be rotatably supported by a bearing 27 on the side of the reduction gear train 22 and a bearing 28 on the side of the driving nose 7. The bearings 27, 28 may be positioned around a rotation axis of the wheel 25. The wheel 25 may receive a rotation output of the reduction gear train 22. The wheel 25 may engage the reduction gear train 22 such that the wheel 25 rotates in a counterclockwise direction of FIG. 7. A clutch mechanism 29 for regulating a rotation direction of the lifter 23 to a predetermined direction may be housed in the gear case 22a.

Figure 8:
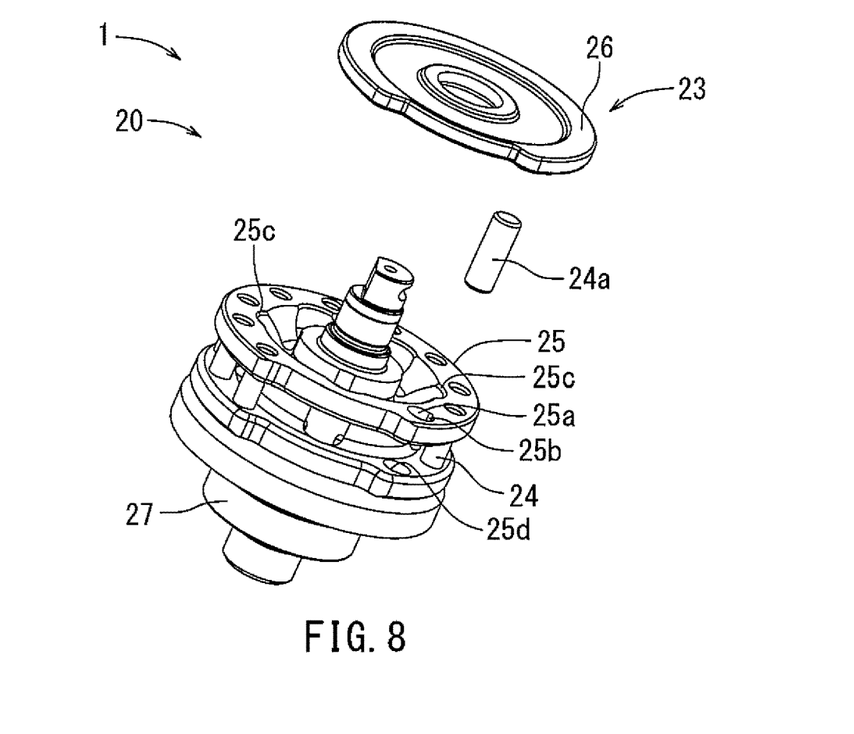
FIG. 8 is an exploded perspective view of the lifter.
Figure 13:
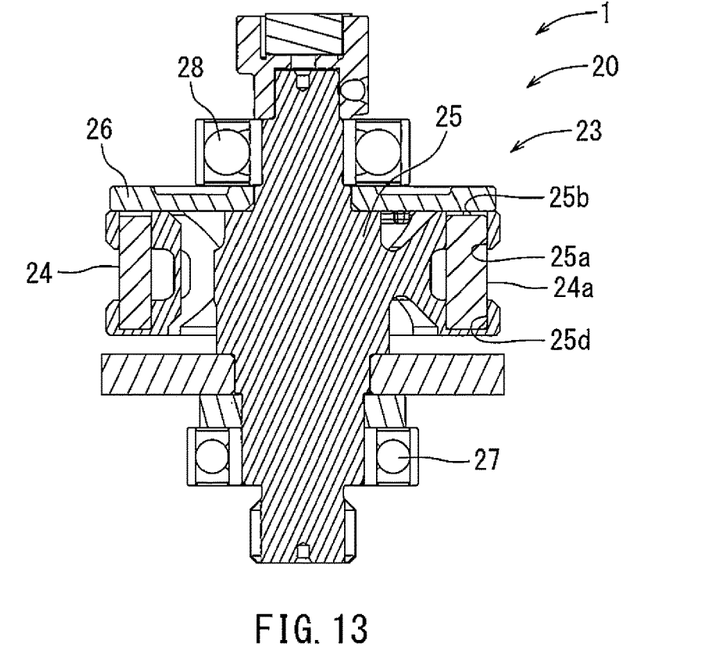
FIG. 13 is a cross-sectional view taken along line XIII-XIII of FIG. 12.

As shown in FIGS. 3 and 8, the plurality of engaging pins 24 may be arranged at equal intervals along an outer periphery of the wheel 25. The engaging pins 24 may be arranged around a rotation axis of the wheel 25. The engaging pins 24 may have a round column shape extending in a direction in which the rotation axis of the wheel 25 extends. As shown in FIGS. 8 and 13, each end of each engaging pin 24 may be supported by a corresponding pin supporting hole 25a, 25d. The pin supporting holes 25a, 25d are formed in the appropriate portions of the wheel 25. The engaging pins 24 may be rotatable around their respective center axes. Referring to FIGS. 2, 8 and 13, the pin supporting holes 25a on the side of the driving nose 7 may be a through hole that passes through the wheel 25. The pin supporting holes 25d on the side of the reduction gear train 22 may be a concave portion that does not pass through the wheel 25.

Figure 9:
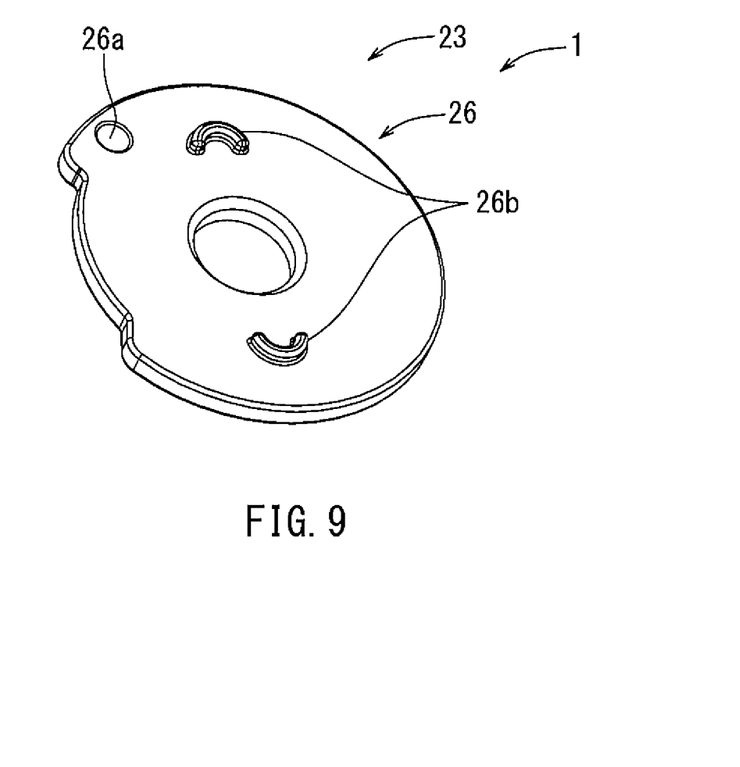
FIG. 9 is a perspective view of a lifter cover viewed from an inner side thereof.
Figure 10:
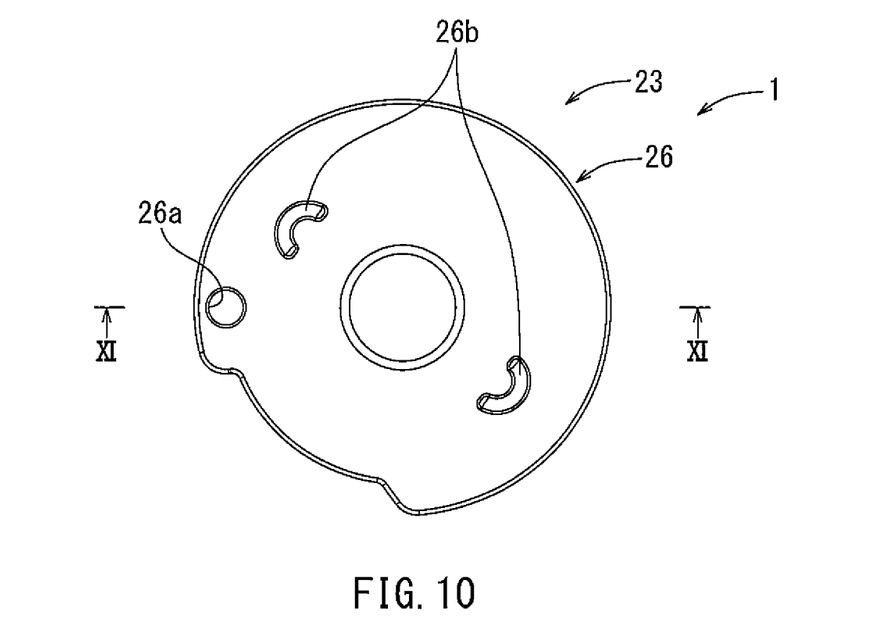
FIG. 10 is a plan view of the lifter cover viewed from an inner side thereof.

As shown in FIG. 8, the lifter 23 may include a cover 26 that is attached to the wheel 25. The cover 26 is configured to cover one end of each pin supporting hole 25a. As shown in FIGS. 9 and 10, the cover 26 may include a pair of engaging protrusions 26b. The engaging portion 26b may be structured to protrude from a surface of the cover 26 that faces the wheel 25. The engaging protrusions 26b may have an arc shape in a plan view. As shown in FIG. 8, the wheel 25 may include a pair of engaging recesses 25c. The pair of engaging recesses 25c may be configured to engage the pair of engaging protrusions 26b. An engagement of the pair of engaging protrusions 26b with the pair of engaging recesses 25c may cause the cover 26 to rotate simultaneously with the wheel 25. The cover 26 may be attached so at to be unrotatable with respect to the wheel 25. When the cover 26 is attached to the wheel 25, the engaging pins 24 may be prevented from disengaging from the wheel 25.

As shown in FIG. 3, the plurality of engaging pins 24 may not be arranged around an entirety of a circumferential area of the wheel 25. In other words, there may be an area where no engaging pin is arranged around the circumferential area of the wheel 25. The plurality of engaging pins 24 may include a hindmost engaging pin 24a that is located at one end in a counterclockwise direction of FIG. 7. Referring to FIG. 3, the hindmost engaging pin 24a may move the driver 6 upward from the standby position to the top dead center. The hindmost engaging pin 24a may have a larger diameter than the other engaging pins 24.

Figure 14:
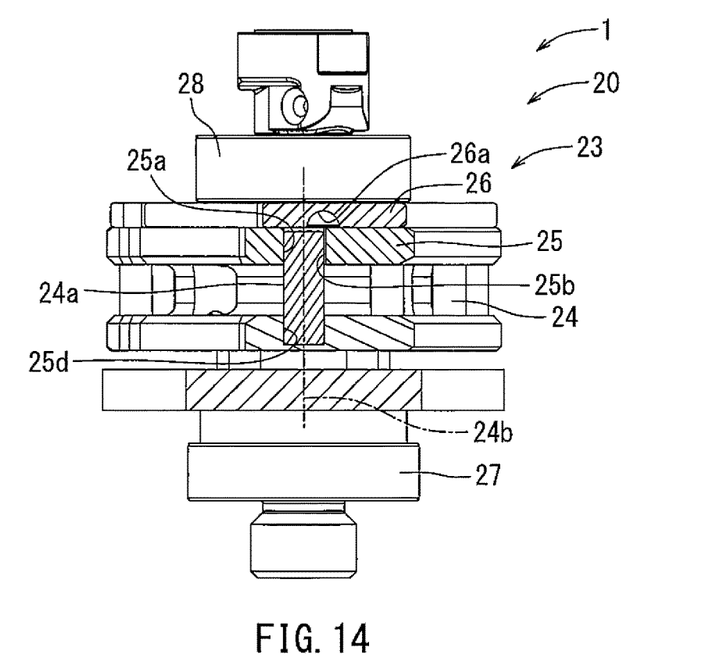
FIG. 14 is a cross-sectional view taken along line XIV-XIV of FIG. 12.

As shown in FIGS. 8 and 14, the pin supporting hole 25a that supports the hindmost engaging pin 24a may include a grease groove 25b. The grease groove 25b may extend in a penetrating direction of the pin supporting hole 25a to penetrate the wheel 25. Referring to FIG. 3, the grease groove 25b may be formed on a side where the hindmost engaging pin 24a engages a lowermost engaging tooth 6b, which is discussed later. For instance, the grease groove 25b may be formed on a right side of the hindmost engaging pin 24a in FIG. 14.

Figure 11:
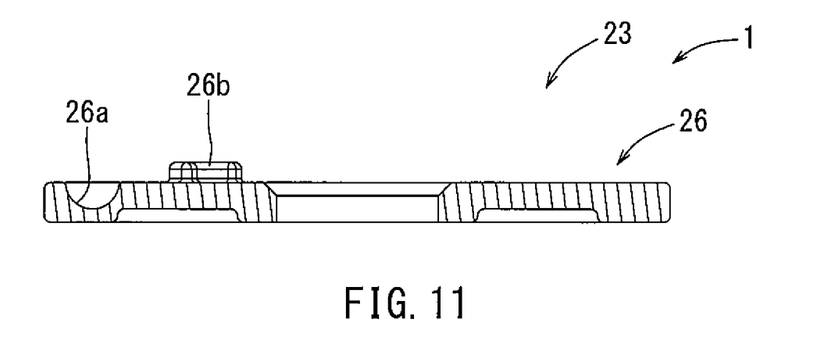
FIG. 11 is a cross-sectional view taken along line XI-XI of FIG. 10.
Figure 12:
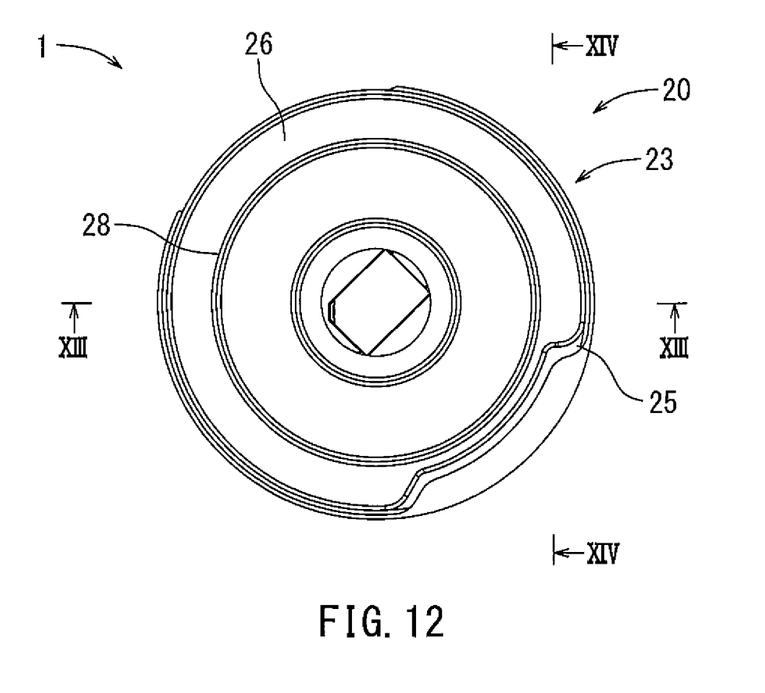
FIG. 12 is a plan view of the lifter.

As shown in FIGS. 9 and 11, the cover 26 may include a grease reservoir 26a. The grease reservoir 26a may be formed in a recessed hemispherical shape on a surface of the cover 26 facing the wheel 25. A high-viscosity lubricant, which may be configured to be supplied to a surface of the hindmost engaging pin 24a, may be applied in the grease reservoir 26a. As shown in FIG. 14, the grease reservoir 26a may face one end of the grease groove 25b and face one end of the hindmost engaging pin 24a when the cover 26 is attached to the wheel 25. The grease reservoir 26a may be formed such that a length of its diameter does not exceed that of the hindmost engaging pin 24a. As shown in FIG. 14, a center of the grease reservoir 26a may be disposed offset relative to a center axis 24b of the hindmost engaging pin 24a. Furthermore, the grease reservoir 26a may not be disposed in line with the center axis 24b of the hindmost engaging pin 24a. The center of the grease reservoir 26a may be disposed in a direction in which the grease groove 25b extends.

As shown in FIG. 3, the driver 6 may include a rack 6a, which has a plurality of engaging teeth 6b. The plurality of engaging teeth 6b may be disposed along a longitudinal direction (up-down direction) at equal intervals. The driver guide 9 may include an opening 9a that is cut in a circular-arc shape on a lateral side of the driving passage 7b. The engaging pins 24 held by the wheel 25 may enter the driving passage 7b through the opening 9a. Each of the plurality of engaging teeth 6b may engage a corresponding engaging pin 24 that has entered the driving passage 7b. A lowermost engaging tooth 6b of the rack 6a may engage the hindmost engaging pin 24a. In FIG. 3, the wheel 25 may rotate in a counterclockwise direction such that each of the plurality of engaging teeth 6b engages the corresponding engaging pin 24. Because of this configuration, the driver 6 may move upward.

In the following, a series of an embodiment of the driving operation of the driving tool 1 will be explained. In a standby state, an embodiment of which is shown in FIG. 3, the driver 6 may be held at the standby position. In this state, the hindmost engaging pin 24a may engage the lowermost engaging tooth 6b of the rack 6a. At this time, the activation switch 12a may be in an OFF state.

Referring to FIG. 1, when the contact arm 7c is pressed against the workpiece W and then the switch lever 12 is pulled while the driving tool 1 is in the standby state, the activation switch 12a may be switched on to start the electric motor 21. By the activation of the electric motor 21, the lifter 23 may rotate in a winding-up direction, e.g., in a counterclockwise direction in FIG. 3. The driver 6 may move upward from the standby position by an upward movement of the hindmost engaging pin 24a. When or just before the driver 6 reaches the top dead center, a driving member n may be supplied from the magazine 8 to the driving passage 7b.

Figure 4:
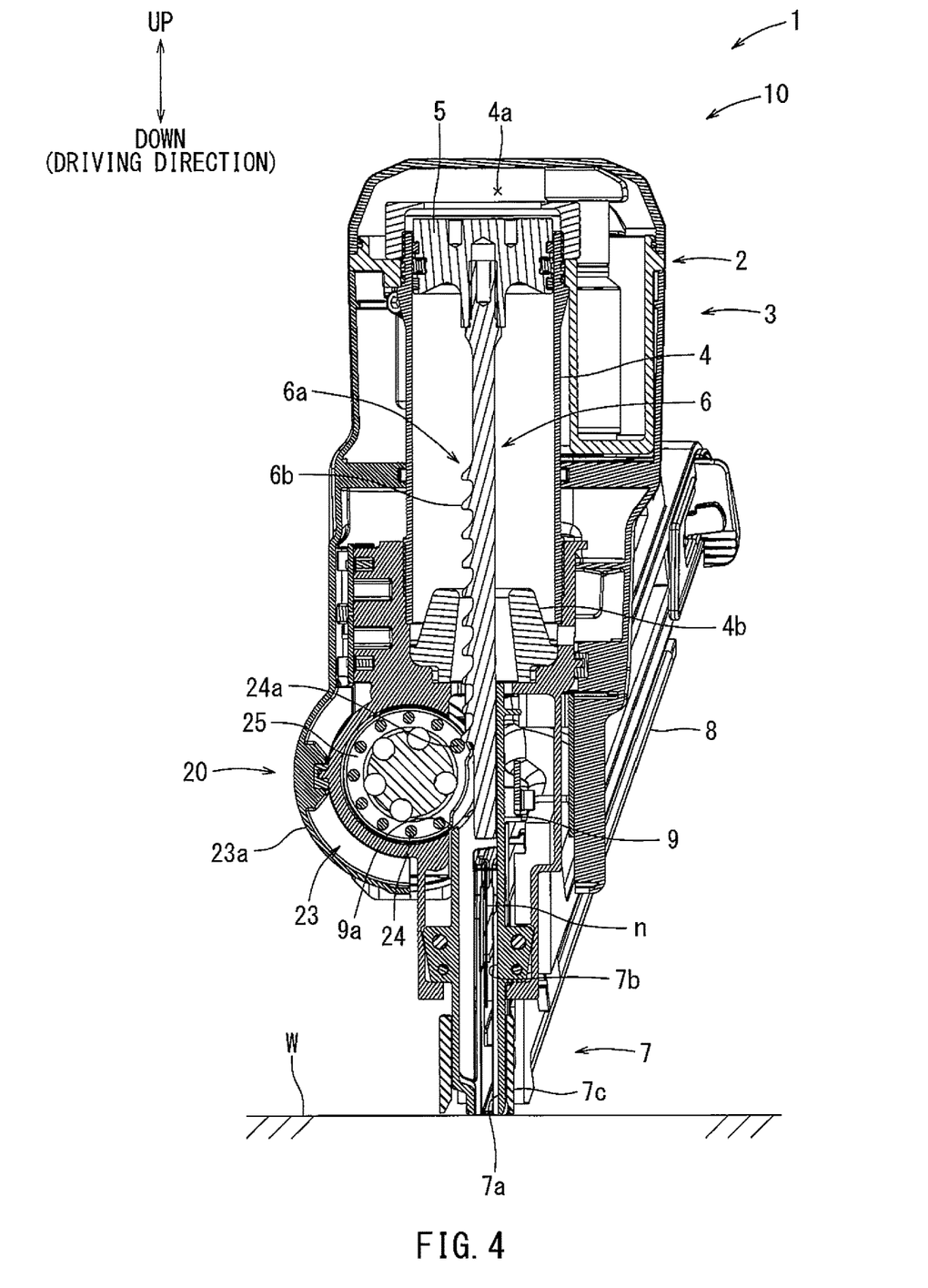
FIG. 4 is a view similar to FIG. 3, showing a state in which a driver reaches a top dead center.
Figure 5:
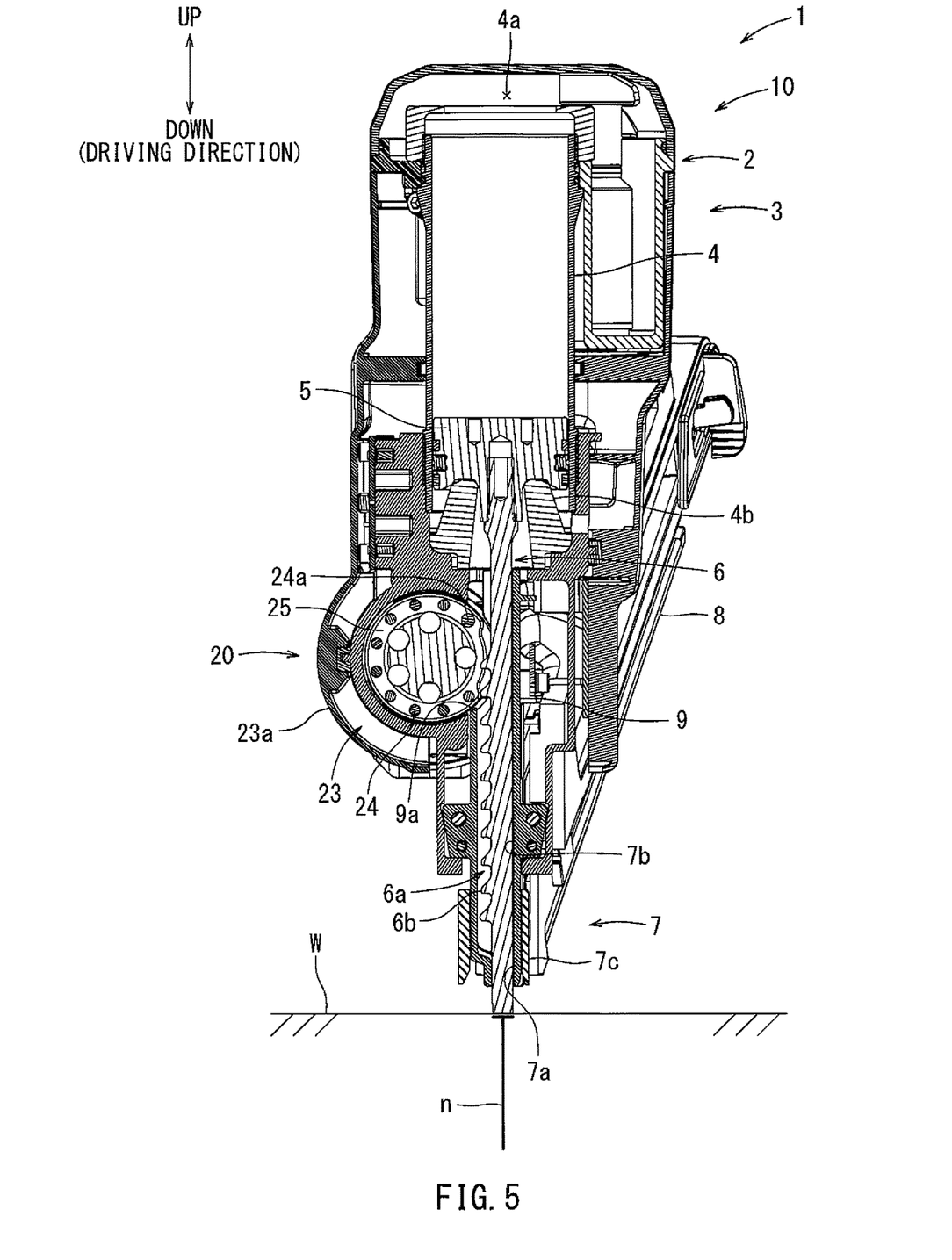
FIG. 5 is a view similar to FIG. 3, showing a state immediately after a driving operation is performed.

When the driver 6 and the piston 5 reach the top dead center, an embodiment of which is shown in FIG. 4, the gas pressure in the accumulation chamber 4a may be higher than in the standby state. Because of this, the piston 5 may receive a greater downward biasing force from the increased gas pressure in the accumulation chamber 4a. When the lifter 23 rotates further, the hindmost engaging pin 24a may disengage from the lowermost engaging pin 6b, and the piston 5 may move toward the bottom dead center, an embodiment of which is shown in FIG. 5. As a result, the driving member n may be driven into the workpiece W by the driver 6.

Figure 6:
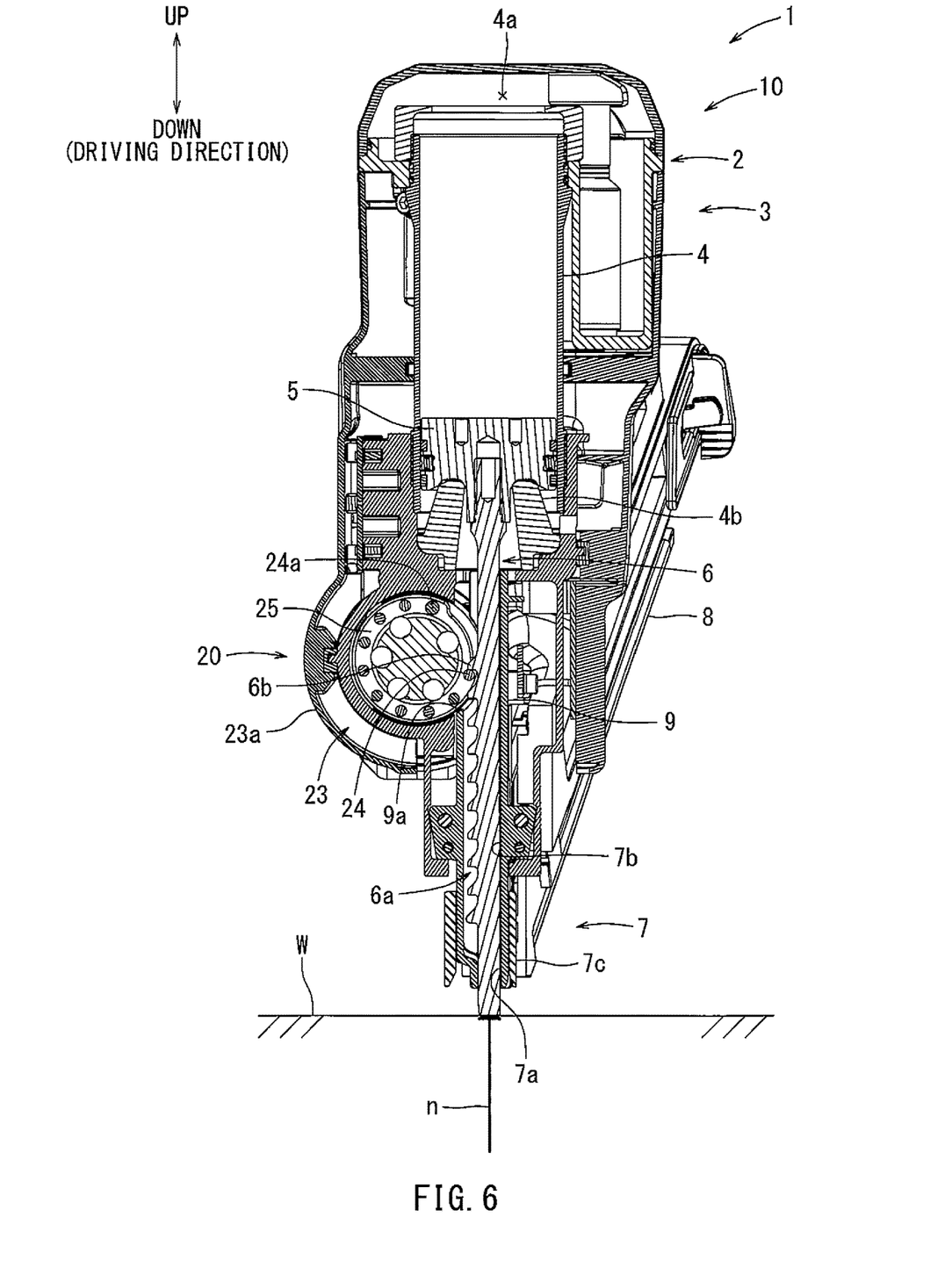
FIG. 6 is a view similar to FIG. 3, showing a state immediately before the driver starts to move upward.
Figure 7:
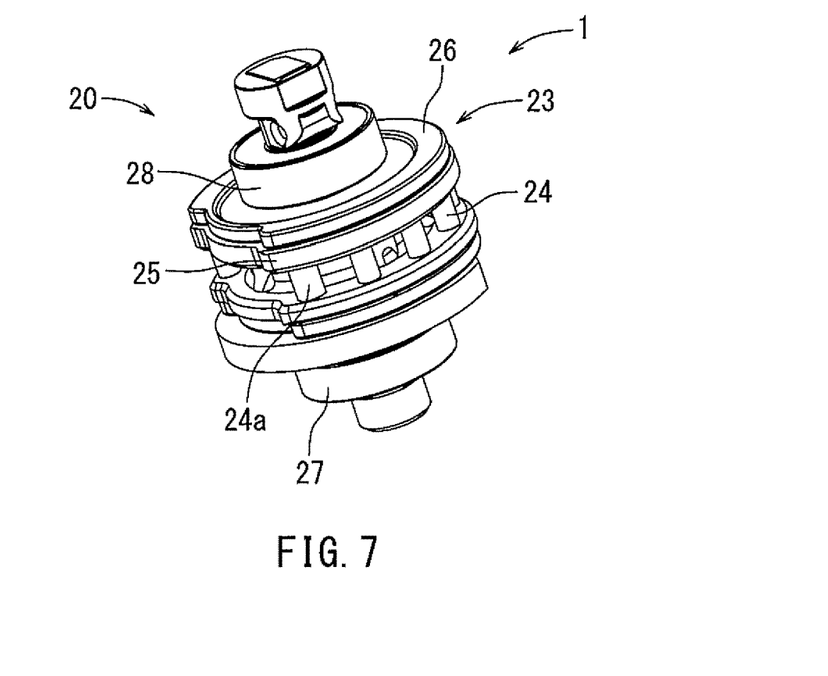
FIG. 7 is a perspective view of a lifter.

The activation switch 12a may remain in an ON state when the driver 6 performs a driving operation. Because of this, the lifter 23 may continue rotating in the counterclockwise direction in FIG. 5. When an uppermost engaging tooth 6b of the rack 6a engages a corresponding engaging pin 24, an embodiment of which is shown in FIG. 6, the driver 6 may start to move upward. When the driver 6 returns to the standby position, an embodiment of which is shown in FIG. 3, the activation switch 12a may be switched off by a command signal from the controller 15. As a result, the electric motor 21 may stop. Because of this configuration, a rotation of the lifter 23 may stop and the driver 6 may remain at the standby position. The command signal may be transmitted from the controller 15 based on a time measured by a timer circuit of the controller 15.

As discussed above, the driving tool 1 may include the driver 6 that is movable in the up-down direction. The driver 6 is configured to drive the driving member n by moving downward. The driving tool 1 also may include the elastic material, such as the gas, that biases the driver in the downward direction, an embodiment of which is shown in FIG. 3. The driving tool 1 may include the electric motor 21 serving as a mechanical power source, and also may include the lifter 23 that is rotated by the electric motor 21. The lifter 23 may be configured to cause the driver 6 to move to the top dead center against the biasing force of the elastic material. The driver 6 may include the plurality of engaging teeth 6b that are linearly arranged. As shown in FIG. 8, the lifter 23 may include the plurality of engaging pins 24 that are arranged in a peripheral direction of the wheel 25. The plurality of engaging pins 24 may be arranged so as to be engageable with the corresponding engaging teeth 6b. Furthermore, the lifter 23 may also include the wheel 25. The wheel 25 may comprises the plurality of pin supporting holes 25a, 25d, each of which respectively holds one end of the corresponding engaging pin 24. The plurality of pin supporting holes 25a and 25d may be positioned in the peripheral direction of the wheel 25. As shown in FIG. 14, the lifter 23 may include the grease groove 25b. The grease groove 25d may be formed on the pin supporting hole 25a that supports the hindmost engaging pin 24a, the hindmost engaging pin 24a penetrating the wheel 25 in a direction in which the pin supporting hole 25 extends. The lifter 23 may also include the recessed grease reservoir 26a facing one end of the grease groove 25b.

Because of this configuration, the lubricant may be supplied from the grease reservoir 26a to the surface of the hindmost engaging pin 24a, which is supported by the pin supporting hole 25a. The lubricant may travel through the grease groove 25b of the pin supporting hole 25a. In other words, the grease groove 25b may supply the high-viscosity lubricant to the surface of the hindmost engaging pin 24a. As a result, wear of the hindmost engaging pin 24a can be reduced.

Referring to FIGS. 3 and 14, the grease groove 25b may be positioned on a side of a position where the hindmost engaging pin 24a contacts the engaging tooth 6b when the driver moves upward. The hindmost engaging pin 24a may receive a large external force on the side of the position where the hindmost engaging pin 24a contacts the engaging tooth 6b. Because of this configuration, the lubricant can be supplied to an area where a large external force is applied to the surface of the hindmost engaging pin 24a. As a result, wear of the hindmost engaging pin 24a can be reduced with a small quantity of lubricant.

As shown in FIGS. 8 and 14, the driving tool 1 may include the cover 26 that is attached to the wheel 25. The cover 26 may be configured to cover one end of each pin supporting hole 25a. The grease reservoir 26a may be formed in the cover 26. Because of this configuration, the lubricant can be supplied to the surface of the hindmost engaging pin 24a without changing the shape of the lifter 23 to a large extent.

As shown in FIGS. 8 and 9, the cover 26 may include the engaging protrusions 26b protruding from the surface of the cover 26 facing the wheel 25. The wheel 25 may include the engaging recesses 25c that engage the engaging protrusions 26b. The engagement between the engaging recesses 25c and the engaging protrusions 26b may restrict rotation of the cover 26 with respect to the wheel 25. Because of this configuration, a position of the grease reservoir 26a of the cover 26 may be fixed with respect to the hindmost engaging pin 24a and with respect to the grease groove 25b of the wheel 25. In other words, the lubricant can be supplied from the grease reservoir 26a to the surface of the hindmost engaging pin 24a through the grease groove 25b at all times.

As shown in FIG. 14, the center of the grease reservoir 26a may be offset relative to the center axis 24b of the hindmost engaging pin 24a. Because of this configuration, the hindmost engaging pin 24a may be prevented from moving in an axial direction, thereby preventing it from entering the grease reservoir 26a. As a result, the hindmost engaging pin 24a may engage the engaging tooth 6b while receiving a large external force from the engaging tooth 6b.

As shown in FIG. 14, the center of the grease reservoir 26a may be positioned along the direction in which the grease groove 25b extends. Because of this configuration, the grease groove 25b is positioned such that a reference line extending in a direction in which the grease groove 25b extends passes through approximately a center of the grease reservoir 26a. Accordingly, a larger quantity of the lubricant can be held in this location than at an edge portion of the grease reservoir 26a. Thus, the supply of the lubricant to the surface of the hindmost engaging pin 24a may be prevented from being interrupted.

In the embodiment shown in FIG. 3, the elastic material may be a gas filled in the accumulation chamber 4a. The gas may possess a certain amount of energy for driving the driver 6 when a driving operation is not performed. Thus, the hindmost engaging pin 24a may continue to receive a large external force from the engaging tooth 6b. By supplying the lubricant from the grease reservoir 26a to the surface of the hindmost engaging pin 24a at all times, wear of the hindmost engaging pin 24a that continues to receive the large external force can be reduced.

As shown in FIGS. 3 and 4, the plurality of engaging pins 24 may include the hindmost engaging pin 24a that engages the lowermost engaging tooth 6b so as to move the driver 6 to the top dead center. As shown in FIG. 14, the grease reservoir 26a and the grease groove 25b may be adjacent to the pin supporting hole 25a supporting the hindmost engaging pin 24a. Thus, the lubricant may be supplied to the hindmost engaging pin 24a that receives the large external force. As a result, wear of the hindmost engaging pin 24a can be reduced.

As shown in FIGS. 11 and 14, the grease reservoir 26a may be formed in a hemispherical shape. Thus, the lubricant may be less prone to be left at an edge portion of the grease reservoir 26a. As a result, the lubricant may be supplied to the grease groove 25b from the grease reservoir 26a without interruption.

Next, a driving tool 30 according to a second embodiment of the present disclosure will be described with reference to FIGS. 15 and 16. The driving tool 30 may include a lifter 31 instead of the lifter 23 of the driving tool 1 depicted in FIG. 7. In the following explanation, configurations of the lifter 31 of the second embodiment which differ from those of the lifter 23 of the first embodiment will be discussed in detail.

Figure 15:
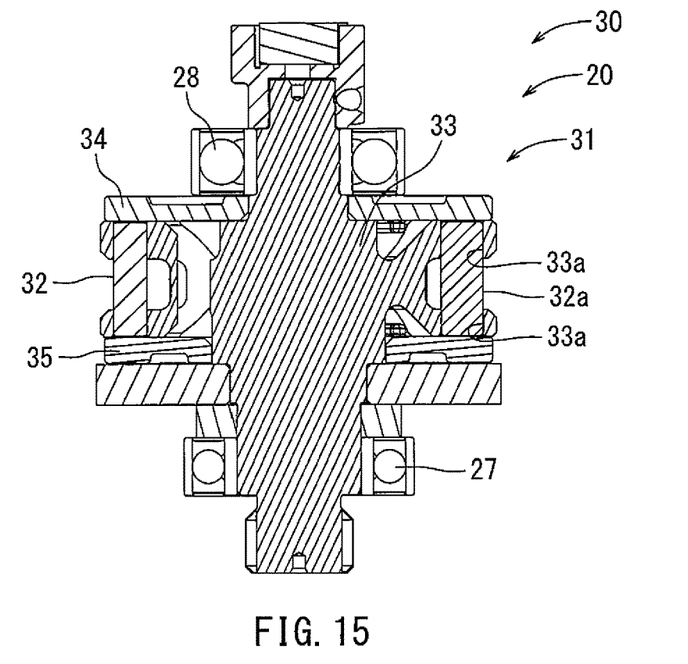
FIG. 15 is a cross-sectional view of a lifter according to a second embodiment of the present disclosures, FIG. 15 being a view which corresponds to FIG. 13.
Figure 16:
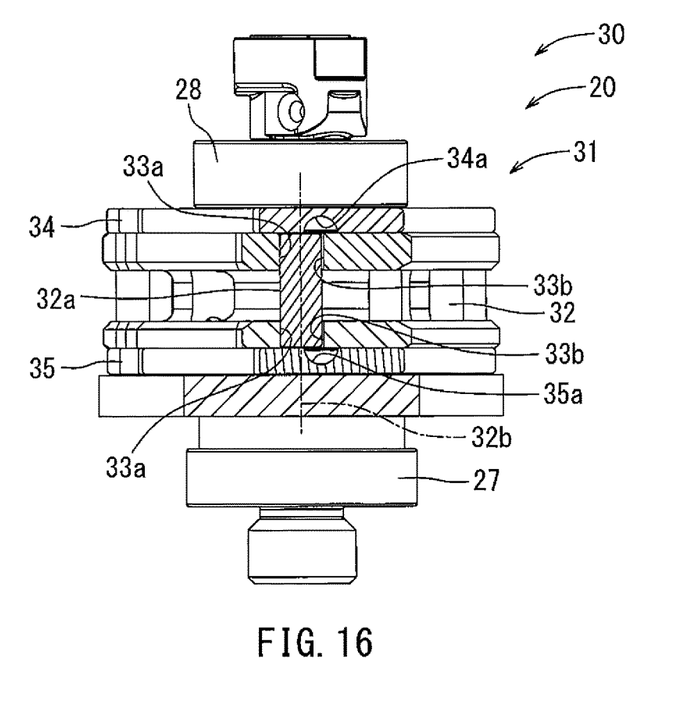
FIG. 16 is a cross-sectional view of the lifter according to the second embodiment of the present disclosures, FIG. 16 being a view which corresponds to FIG. 14.

As shown in FIGS. 15 and 16, the lifter 31 of the second embodiment may include a wheel 33 and a plurality of engaging pins 32 supported by the wheel 33. The wheel 33 may have a cylindrical shape. The plurality of engaging pins 32 may be arranged at equal intervals along an outer periphery of the wheel 33. The plurality of engaging pins 32 may be arranged around a rotation axis of the wheel 33. The engaging pins 32 may have a round column shape extending in a direction in which the rotation axis of the wheel 33 extends. Each end of each engaging pin 32 may be supported by a corresponding pin supporting hole 33a formed in the wheel 33. Each engaging pin 32 may be rotatable around its center axis. The pin supporting holes 33a that support the corresponding engaging pin 32 may be arranged in line with each other in a direction in which the engaging pin 32 extends. The pin supporting holes 33a may pass through the wheel 33.

As shown in FIGS. 15 and 16, the lifter 23 may include a first cover 34 and a second cover 35, each of which is attached to the wheel 33 to cover one end of the pin supporting hole 33a. The first cover 34 may be attached on a side of a bearing 28. The second cover 35 may be attached on a side of another bearing 27. Though not shown in the figures, each of the first cover 34 and the second cover 35 may include engaging protrusions protruding from the surface thereof that faces the wheel 33. The wheel 33 may include engaging recesses that engage the engaging protrusions of the first cover 34 and the second cover 35. Because of this configuration, the first cover 34 and the second cover 35 may be attached so as to not rotate relative to the wheel 33. By attaching the first cover 34 and the second cover 35 to the wheel 33, both ends of each engaging pin 32 may be prevented from disengaging from the wheel 33.

As shown in FIGS. 15 and 16, the plurality of engaging pins 32 may include a hindmost engaging pin 32a configured to move the driver 6 from the standby position to the top dead center. The hindmost engaging pin 32a may have a larger diameter than the other engaging pins 32.

As shown in FIG. 16, each of the pin supporting holes 33a supporting the hindmost engaging pin 32a may include a grease groove 33b. Each grease groove 33b may extend in a direction in which the pin supporting hole 33a extends to penetrate the wheel 33. Each grease groove 33b may be formed on a side where the hindmost engaging pin 32a engages the lowermost engaging tooth 6b. The grease groove 33b may be formed on a right side of the hindmost engaging pin 32a in FIG. 16.

As shown in FIG. 16, the first cover 34 and the second cover 35 may include a grease reservoir 34a and a grease reservoir 35a, respectively. Both grease reservoirs 34a, 35a may be formed in a recessed hemispherical shape on a surface of the corresponding first or second cover 34, 35 facing the wheel 33. A high-viscosity lubricant, which may be configured to be supplied to the surface of the hindmost engaging pin 32a, may be applied in the grease reservoirs 34a, 35b. The grease reservoirs 34a, 35b may face the ends of the grease grooves 33b and the hindmost engaging pin 32a when the first cover 34 and the second cover 35 are attached to the wheel 33. Each of the grease reservoirs 34a, 35a may be formed such that a length of each diameter does not exceed that of the hindmost engaging pin 32a. A center of each of the grease reservoirs 34a, 35a may be disposed offset relative to a center axis 32b of the hindmost engaging pin 32a. Furthermore, the center of each of the grease reservoirs 34a, 35a may be disposed along a direction in which the grease grooves 33b extends. Because of this configuration, the lubricant may be supplied to the hindmost engaging pin 32a, which may receive the large external force. As a result, wear of the hindmost engaging pin 32a can be reduced.

The embodiments discussed above may be modified in various ways. In the above embodiments, the lifters 23, 31 may be exemplified in the gas-spring type driving tools 1, 30. Instead, the lifters 23, 31 can be applied to a mechanical-spring type driving tool, in which a compression spring may be used to obtain a biasing force as a thrust power. Furthermore, in the above embodiments, the timer circuit of the controller 15 may determine a time when the driver 6 has reached the standby position. Instead, the position of the driver 6 can be determined by the controller 15 measuring a rotation angle of the electric motor 21 and calculating a rotation angle of the lifter 23 based on the measured rotation angle.

Furthermore, in the above embodiments, the grease reservoirs 26a, 34a, 35a and the grease grooves 25b, 33b were provided for supplying the lubricant only to the hindmost engaging pin 24a, 32a. Instead, the grease reservoirs and the grease grooves may be formed adjacent to all engaging pins in order to supply the lubricant to all engaging pins. Alternatively, the grease reservoirs and the grease grooves may be formed to be adjacent to two or more engaging pins in order to supply the lubricant to the two or more engaging pins. Furthermore, the shape of the grease reservoirs may not be limited to a hemisphere. For example, a groove having an approximately semicircular cross-section may be formed on the wheel extending in a peripheral direction of the wheel 25, 33 for supplying the lubricant to a plurality of engaging pins 24, 32.

What is claimed is:

1. A driving tool, comprising:
   a driver that is movable in an up-down direction and configured to drive a driving member by moving downward;
   an elastic material that biases the driver in a downward direction;
   an electric motor; and
   a lifter that is configured to (i) be rotated by the electric motor and (ii) move the driver to a top dead center against a biasing force of the elastic material; wherein:
   the driver includes a plurality of engaging teeth that are linearly arranged; and
   the lifter comprises:
   a wheel including a plurality of pin supporting holes spaced in a peripheral direction of the wheel;
   a plurality of engaging pins spaced in the peripheral direction so as to be engageable with the plurality of engaging teeth, an end of each of the plurality of engaging pins being received in a separate one of the plurality of pin receiving holes, the each of the plurality of engaging pins has a longitudinal axis that is parallel to longitudinal axes of all other of the plurality of engaging pins;
   a grease reservoir; and
   a grease groove in the wheel (i) defined by an interior surface of one of the plurality of pin supporting holes, (ii) extending, in a direction parallel to the longitudinal axis of the each of the plurality of engaging pins, an entire length of the interior surface in the direction parallel to the longitudinal axis and (iii) configured to receive grease from the grease reservoir.

2. The driving tool according to claim 1, wherein the grease reservoir is where an engaging pin of the plurality of engaging pins contacts an engaging tooth of the plurality of engaging teeth when the driver moves upward.

3. The driving tool according to claim 1, further comprising a cover that is attached to the wheel, the cover covering one end of each of the plurality of pin supporting holes;
   wherein the grease reservoir is in the cover.

4. The driving tool according to claim 3, wherein:
   the cover includes an engaging protrusion that protrudes from a surface of the cover; and
   the wheel includes an engaging recess that engages the engaging protrusion of the cover so as to prevent the cover from rotating with respect to the wheel.

5. The driving tool according to claim 1, wherein a center of the grease reservoir is offset from a center axis of an engaging pin of the plurality of engaging pins.

6. The driving tool according to claim 1, wherein a center of the grease reservoir is in the direction parallel to the longitudinal axis.

7. The driving tool according to claim 1, wherein the elastic material is a fluid.

8. The driving tool according to claim 1, wherein:
   the plurality of engaging pins include a hindmost engaging pin that is configured to engage one of the plurality of engaging teeth so as to move the driver to the top dead center; and
   the grease reservoir and the grease groove are adjacent to one of the plurality of pin supporting holes that holds the hindmost engaging pin.

9. The driving tool according to claim 1, wherein the grease reservoir is in a hemispherical shape.

10. The driving tool according to claim 1, wherein the grease groove penetrates the one of the plurality of pin supporting holes in a direction perpendicular to the direction parallel to the longitudinal axis.

11. The driving tool according to claim 6, wherein the center of the grease reservoir extends through the grease groove.

12. A driving tool, comprising:
    a driver that is movable in an up-down direction and configured to drive a driving member by moving downward;
    an elastic material that biases the driver in a downward direction;
    an electric motor; and
    a lifter that is configured to (i) be operatively rotated by the electric motor and (ii) move the driver to a top dead center against a biasing force of the elastic material; wherein:
    the driver includes a plurality of engaging teeth that are linearly arranged;
    the lifter comprises:
    a wheel including a plurality of pin supporting holes spaced in a peripheral direction of the wheel;
    a plurality of engaging pins spaced in the peripheral direction so as to be engageable with the plurality of engaging teeth, an end of each of the plurality of engaging pins being received in a separate one of the plurality of pin receiving holes, the each of the plurality of engaging pins has a longitudinal axis that is parallel to longitudinal axes of all other of the plurality of engaging pins; and
    a reservoir adjacent to one end of a first pin supporting hole of the plurality of pin supporting holes in a direction parallel to the longitudinal axis of the each of the plurality of engaging pins; and the reservoir directly overlaps a portion of the first pin supporting hole in the direction parallel to the longitudinal axis at the one end of the pin supporting hole.

13. The driving tool according to claim 12, wherein the direction parallel to the longitudinal axis is perpendicular to the up-down direction.

14. The driving tool according to claim 12, wherein the reservoir is outside of the wheel in a direction along which the wheel rotates.

15. The driving tool according to claim 13, wherein the reservoir does not directly overlap an entirety of the first pin supporting hole in a direction along which the wheel rotates.

16. The driving tool according to claim 12, wherein, when the driving tool is in a standby state, a center of the reservoir is nearer to a first engaging tooth of the plurality of engaging teeth than a center of the first pin supporting hole.

17. The driving tool according to claim 12, wherein a grease is in the reservoir.

18. The driving tool according to claim 12, further comprising a groove formed in a side surface of the first pin supporting hole, the groove extending in the direction parallel to the longitudinal axis.

19. The driving tool according to claim 18, wherein the reservoir directly overlaps the groove in the direction parallel to the longitudinal axis.

20. A driving tool, comprising:
    a driver that is movable in an up-down direction and configured to drive a driving member by moving downward;
    an elastic material that biases the driver in a downward direction;
    an electric motor; and
    a lifter that is configured to (i) be rotated by the electric motor and (ii) move the driver to a top dead center against a biasing force of the elastic material; wherein:
    the driver includes a plurality of engaging teeth that are linearly arranged;
    the lifter comprises:
        a wheel including a plurality of pin supporting holes spaced in a peripheral direction of the wheel;
        a plurality of engaging pins spaced in the peripheral direction so as to be engageable with the plurality of engaging teeth, an end of each of the plurality of engaging pins being received in a separate one of the plurality of pin receiving holes;
        a cover that is attached to the wheel, the cover covering one end of each of the plurality of pin supporting holes; and
        a reservoir (i) in the cover and (ii) adjacent to a first pin supporting hole of the plurality of pin supporting holes in an axial direction in which the first pin supporting hole axially extends;
    the cover includes an engaging protrusion that protrudes from a surface of the cover; and
    the wheel includes an engaging recess that engages the engaging protrusion of the cover so as to prevent the cover from rotating with respect to the wheel.

* * * * *